US008160163B1

(12) United States Patent
Yucek et al.

(10) Patent No.: US 8,160,163 B1
(45) Date of Patent: Apr. 17, 2012

(54) METHOD FOR OFDM SIGNAL IDENTIFICATION AND PARAMETER ESTIMATION

(75) Inventors: Tevfik Yucek, Sunnyvale, CA (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 776 days.

(21) Appl. No.: 12/187,035

(22) Filed: Aug. 6, 2008

Related U.S. Application Data

(60) Provisional application No. 60/954,115, filed on Aug. 6, 2007.

(51) Int. Cl.
*H04K 1/10* (2006.01)
(52) U.S. Cl. ........ 375/260; 375/262; 375/246; 375/299; 375/324; 375/349; 375/347
(58) Field of Classification Search .................. 375/260, 375/262, 246, 299, 324, 349, 347
See application file for complete search history.

(56) References Cited

U.S. PATENT DOCUMENTS

| | | | |
|---|---|---|---|
| 2004/0218522 A1* | 11/2004 | Sundstrom et al. | 370/208 |
| 2007/0091998 A1 | 4/2007 | Woo et al. | |
| 2008/0080604 A1* | 4/2008 | Hur et al. | 375/224 |
| 2008/0207136 A1* | 8/2008 | Tang et al. | 455/73 |

OTHER PUBLICATIONS

G. Vardoulias, J. Faroughi-Esfahani, G. Clemo and R. Haines. "Blind radio access technology discovery and monitoring for software-defined radio communication systems: problems and techniques." Proc. Int. Conf. 3G Mobile Communication Technologies. 2001. pp. 306-310. 2001.

J. Palicot, C. Roland. "A new concept for wireless reconfigurable receivers." IEEE Communication Magazine. vol. 41. pp. 124-132. 2003.

Gandetto, Matteo and Guiainazzo, Marco and Regazzoni, Carlo S. "Use of Time-Frequency Analysis and Neural Networks for Mode Identification in a Wireless Software-Defined Radio Approach." EURASIP Journal on Applied Signal Processing. vol. 2004. No. 12. pp. 1778-1790. 2004.

A. Fehske, J. Gaeddert, and J.Reed. "A new approach to Signal classification using Spectral correlation and neural networks." IEEE Int. Symposium on New Frontiers. pp. 144-150. Nov. 2005.

Danijela Cabric, Shridhar Mubaraq Mishra, Robert W. Brodersen. "Implementation Issues in Spectrum Sensing for Cognitive Radios." Asilomar Conf. on Signals, Systems and Computers. vol. 1. pp. 772-776. Nov. 2004.

(Continued)

*Primary Examiner* — Kabir A Timory
(74) *Attorney, Agent, or Firm* — Robert Varkonyi; Smith & Hopen, P.A.

(57) ABSTRACT

Spectrum sensing is one of the most challenging problems in cognitive radio systems. The spectrum of interest needs to be characterized and unused frequencies should be identified for possible exploitation in a simple and fast way, allowing the radio to catch up with the changing transmission parameters. A sensing method is presented where primary users are identified by matching the features extracted from the received signal to the a priori information about primary users' transmission characteristics. For estimation of some signal parameters, the cyclostationarity of the transmission spectrum is explored by using a suboptimal maximum likelihood (ML) estimator. The proposed algorithms can be used in cognitive radio for identifying various transmissions and for electronic surveillance.

12 Claims, 9 Drawing Sheets

OTHER PUBLICATIONS

Danijela Cabric, Artem Tkachenko, Robert W. Brodersen. "Experimental Study of Spectrum Sensing based on Energy Detection and Network Cooperation." ACM International Conference Proceeding Series. vol. 222. 2006.

Ghasemi, A, Sousa, E.S. "Collaborative spectrum sensing for opportunistic access in fading environments." New Frontiers in Dynamic Spectrum Access Networks. 1st IEEE Int'l Symposium on New Frontiers in Dynamic Spectrum Access Networks. DySPAN. pp. 131-136. Nov. 2005.

Zhi Tian; Giannakis, G. B. "A Wavelet Approach to Wideband Spectrum Sensing for Cognitive Radios." 1st International Conference on Cognitive Radio Oriented Wireless Networks and Communications. pp. 1-5. 2006.

Yucek, T.; Arslan, H. "OFDM Signal Identification and Transmission Parameter Estimation for Cognitive Radio Applications." Global Telecommunications Conference. IEEE. Nov. 26-30, 2007. pp. 4056-4060.

* cited by examiner

METHOD FOR OFDM SIGNAL IDENTIFICATION AND PARAMETER ESTIMATION

CROSS REFERENCE TO RELATED APPLICATION

This application claims priority to U.S. Provisional Patent Application No. 60/954,115, entitled "OFDM Signal Identification and Transmission Parameter Estimation for Cognitive Radio Applications", filed Aug. 6, 2007. The contents of which are herein incorporated by reference.

FIELD OF INVENTION

This invention relates to spectrum sensing for cognitive radio applications. Specifically, the invention relates to a method for signal identification and parameter estimation.

BACKGROUND OF THE INVENTION

As wireless communication systems are making transition from voice-only communications to interactive Internet data and multi-media applications, the desire for higher data rate transmissions are increasing tremendously. With the increase in wireless devices, future technologies will face spectral crowding, and coexistence of wireless devices will be a major problem. Considering the limited bandwidth availability, accommodating the demand for higher capacity and data rates is a challenging task, requiring innovative technologies that can offer new ways of exploiting the available radio spectrum.

Cognitive radio is a viable solution for spectrum scarcity problem that arises with increased number of users and applications that require higher data rates such as video and Internet by enabling opportunistic spectrum usage (Mitola, J. and J. Maguire, G. Q., "Cognitive radio: making software radios more personal," *IEEE Personal Commun. Mag.*, vol. 6, no. 4, pp. 13-18, August 1999). One crucial aspect of cognitive radio is related to its ability to autonomously identify the available unused spectrum and to adapt to environmental and spectral characteristics of a geographical location.

In cognitive radio, primary users have higher priority or legacy rights than secondary users on the spectrum usage. Conversely, secondary users exploit the idle spectrum as to not interfere with primary users. Therefore, secondary users need to have the capability to sense the spectrum usage reliably. Spectrum sensing requires obtaining the spectrum characteristics across multiple dimensions such as time, space, frequency, and code.

Matched filtering is the optimum method for detection of primary users. However, traditional matched filtering requires the cognitive radio to demodulate the received signal and requires perfect knowledge of the primary users signaling features. Moreover, since cognitive radio needs receivers for all signal types, traditional matched-filtering is practically difficult to implement. Spectrum sensing can also be performed by correlating the received signal with a known copy of itself, known as waveform-based sensing (H. Tang, "Some physical layer issues of wide-band cognitive radio systems," in *Proc. IEEE mt. Symposium on New Frontiers in Dynamic Spectrum Access Networks*, Baltimore, Md., USA, November 2005, pp. 151-159). However, this method is only applicable to systems with known repeating patterns such as wireless metropolitan area network (WMAN) signals (*IEEE Standard for Local and Metropolitan area networks Part* 16, The Institute of Electrical and Electronics Engineering, Inc. Std. IEEE 802.16E-2005, 2005). Another method for detection of primary user transmission is cyclostationarity feature detection, where cyclostationarity features of the received signal are exploited (D. Cabric and R. W. Brodersen, "Physical layer design issues unique to cognitive radio systems," in *Proc. IEEE mt. Symposium on Personal, Indoor and Mobile Radio Commun.*, vol. 2, Berlin, Germany, September 2005, pp. 759-763). These features are caused by the periodicity in the signal or in its statistics (mean, autocorrelation etc.). Instead of power spectral density (PSD), cyclic correlation function is used for detecting the signals present in a given spectrum. Cyclostationarity based methods can differentiate noise from the primary users. Finally, energy detector-based spectrum sening is common because of low hardware complexity, robust performance, and blind primary users' signal characterization. The presence of a signal can be detected by comparing the output of the energy detector with a threshold which depends on the noise floor. However, energy detection suffers from an inability to differentiate interference from primary users' signals and poor performance under low signal-to-noise ratios (SNRs) (H. Tang, "*Proc. IEEE mt. Symposium on New Frontiers in Dynamic Spectrum Access Networks*, Baltimore, Md., USA, November 2005, pp. 151-159).

Cognitive radio devices must identify unused signal spectrum in a fast and efficient way. Conventional algorithms sense the spectrum without exploiting all the properties of primary users. The a priori information about transmission properties of possible primary users can be leveraged for developing a framework for spectrum sensing.

Current spectrum estimation techniques do not utilize most of the a priori knowledge about primary users. This knowledge about center frequencies and bandwidth of this type of a signal along with other transmission characteristics can be exploited to identify the presence of a transmission and thus to improve spectrum sensing accuracy. The features that describe devices can be obtained by investigating the received signal. These features then can be matched to the a priori sets of known parameters. By finding the exact transmission characteristics of primary users, possible estimation errors due to sensing algorithm and noise can be removed.

SUMMARY OF THE INVENTION

Multi-carrier techniques, specifically orthogonal frequency division multiplexing (OFDM), are commonly used in modern communications systems. For identification of active transmissions, signals can be classified as single-carrier and multi-carrier, reducing candidate size. Moreover, transmission parameters of an OFDM based system can be detected blindly if the system is not known to cognitive radio. The capability of identifying transmission parameters using blind detection can be useful for spectrum survey for radio monitoring systems to discover enemy and illegal transmissions as well.

To realize a fully cognitive radio, the cognitive devices should be aware of not only spectral content but also temporal and spatial contents of the environment that they are operating in. Information about the transmission properties of possible primary users, such as transmission bandwidths and center frequencies, are used to develop a signal identification method where the parameters estimated from the received signal. These estimated parameters are matched to the possible transmission parameters for achieving a more robust and reliable sensing. The sensing might also be performed by correlating the received signal with a known copy of itself. This method is only applicable to systems with known signal patterns such as wireless metropolitan area network (WMAN) signals, and it is termed as waveform-based sensing.

Another method for detection of primary user transmission is cyclostationarity feature detection. This algorithm exploits the cyclostationarity features of the received signal caused by the periodicity in the signal or in its statistics. Cyclic correlation function is used for detecting the signals present in the given spectrum. This method can also differentiate the noise from the primary users which is a result of the fact that noise is a wide-sense stationary (WSS) signal with no correlation while modulated signals are cyclostationaiy with spectral correlation due to the redundancy of signal periodicities. An energy detector-based approach is used as an intermediate step for obtaining features about the transmissions in the frequencies of interest. Energy detector based approaches (also called radiometry or periodogram) are the most common way of spectrum sensing because of their low computational complexity and because the receiver does not need any knowledge on the primary users' signal.

In one embodiment, waveform spectrum sensing is performed by utilizing a method of extracting signal features from a test frequency. A series of useful algorithms include energy detector or cyclostationary feature extraction fast Fourier transform, time frequency transform, discrete Fourier transform, and inverse discrete Fourier transform. These extracted signal features are used to identify use of a transmission spectrum by a primary user. The radio exploits a primary user's transmission spectrum use in characterizing the multi-dimensional spectrum.

Feature extraction in the spectrum sensing utilizes estimates of symbol duration and cyclic prefix size using known OFDM transmission characteristics in some embodiments. Symbol length estimates are used to calculate cyclic prefix duration and timing offset. Alternatively, the cyclic prefix duration is estimated by assuming cyclic prefix duration is multiple of symbol duration, from ¼, ⅛, 1/16, or 1/32. Once the cyclic prefix is known, the repetition in cyclic prefix is used to find data duration.

To determine primary use of the transmission spectrum, the square of the fast Fourier transform output is compared to a threshold. Frequency domain features and time domain features are estimated in some embodiments to reduce cognitive radio hardware requirements. These features include bandwidth, center frequency, single-carrier transmission, multi-carrier transmission, maximum signal duration, multiple accessing, duplexing, frame duration, and spreading codes. The feature sets may be classified using Baysean decisions. In some embodiments, the method is a function of the received signal evaluated at the maximum likelihood estimates of signal parameters.

Also presented is a method of estimating waveform parameters for transmission spectrum. A carrier transmission must first be identified as either multi-carrier or single carrier, followed by a determination of the radio access technology (RAT) classification. Symbol duration and cyclic prefix length are identified using estimations based on the radio access technology. Symbol length is estimated to calculate cyclic prefix duration and timing offset, which are alternatively assumed to be a multiple of symbol duration, from ¼, ⅛, 1/16, or 1/32. The number and frequencies of subcarriers are then estimated. In some embodiments, the method relies on a modified likelihood function for obtaining performance results of the proposed method. A Bayesian classification is used to assign features of RAT to the method.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Spectrum sensing is realized in three main steps: 1) extraction of a predefined set of features from the received signal; 2) using the extracted features for making decisions on the presence of an anticipated transmission; and 3) exploiting the gained knowledge about the active primary users for multi-dimensional spectrum characterization.

Figure 1:
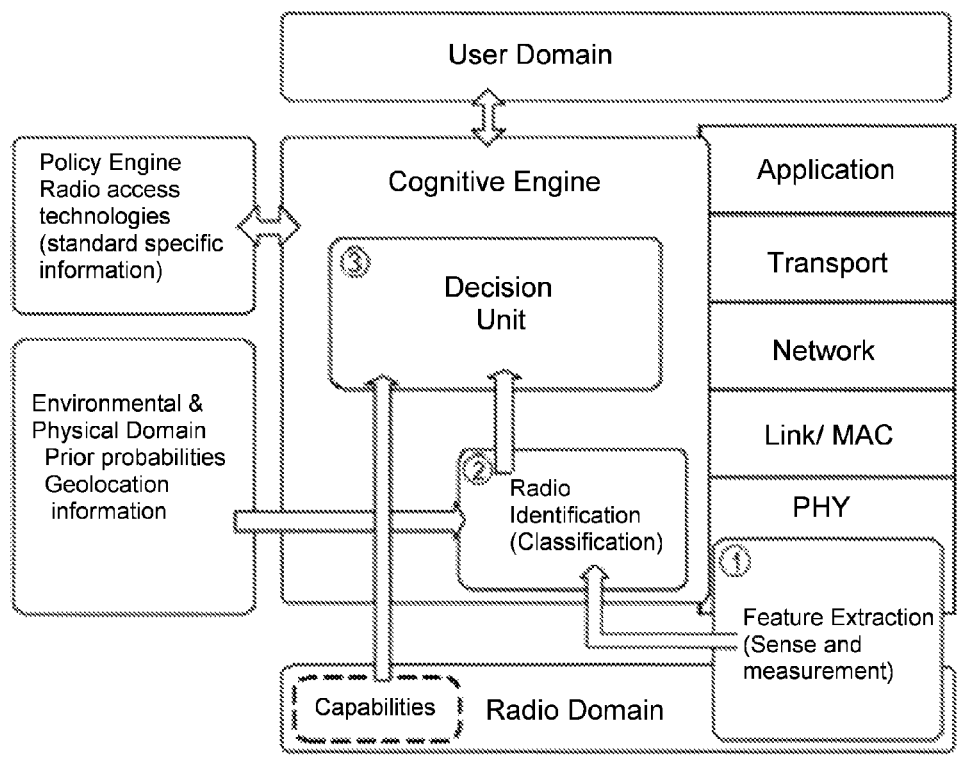
FIG. 1 is a block diagram indicating the three main steps required in to model a cognitive engine in the present invention.

The system model for cognitive radio is shown in FIG. 1, indicating the three main steps. The cognitive engine governs the selection of bands for transmission and communicates with radio, user, and open systems interconnection reference (OSI) layers. Radio identification is performed based on the extracted features of received signal, environmental information and cognitive radio's prior knowledge. The set of possible radio access technologies (RATs) and their transmission parameters can be collected by cognitive devices using previous decisions (blind) or they can be broadcasted by a central unit (assisted). Alternatively, these parameters can be pre-configured to cognitive radio during hardware design.

In feature extraction, parameters are extracted using algorithms such as energy detector or cyclostationary based feature extraction. These algorithms can be used individually or together for estimating different parameters. These parameters include frequency domain features, such as bandwidth, center frequency, and single carrier or multi-carrier, time domain features like maximum signal duration, multiple accessing, duplexing method, frame duration, spreading codes, and other features, such as cumulants, power moment matrices, and zero-crossing rate.

The dimension of the feature set is a design parameter. Some or all of the parameters can be extracted from the received data and used for classification. However, the larger the dimension of the feature set, the more complex the system, and the more reliable the classification results. Selection of the employed features is performed by considering the characteristics of potential systems. The feature set can be represented as a vector x which is a point in multidimensional feature space. Then, this vector is used for classifying the detected transmission into one of K candidate transmissions using a classifier.

In decision making, the measured signal is associated with a RAT, using classification methods such as pattern recognition, neural networks, or statistical classification. Selection of a classification method depends on the considered RATs and available features. The classification performed in this step is different from blind modulation classification task because not only the type of signaling but also some parameters of the transmission need to be identified.

Multi-dimensional spectrum characterization, the output of classification is used for obtaining a complete multidimensional spectrum awareness in cognitive radio. The knowledge of primary users helps identify the transmission opportunities across different dimensions. For example, if the identified signal is a cordless phone, the range is expected to be around 100 meters and for Bluetooth signals it is around 10 meters. This knowledge can be used in a cooperative sensing environment for gaining knowledge in the space dimension. The characterization in time, frequency, and code dimensions is straightforward once primary users are associated with a particular RAT.

The feature extraction algorithms are based on FFT operation which is used to transform time-domain signal into frequency domain, using FFT output samples to decide whether an FFT frequency bin is occupied by a primary user. However, the primary user's signal is usually spread over a group of FFT output samples as the bandwidth of primary user is expected to be larger than the considered bandwidth divided by the FFT size. Using this fact, the FFT output is filtered for noise averaging in order to obtain a better performance.

The proposed algorithms are especially suitable for cognitive devices using OFDM as their transmission technology. The availability of FFT circuitry in these systems eases the requirements on the hardware. Moreover, the computational requirements of the spectrum sensing algorithm is reduced as receiver needs to apply FFT for data detection.

OFDM signals can be considered as a composition of large number of independent random signals. Hence, sampled OFDM signals can be assumed to have a Gaussian distribution thanks to central limit theorem. This observation is used to classify signals as single-carrier or multi-carrier by applying normality tests to incoming signal. However, in the presence of multipath-fading and interference, single-carrier signals at the cognitive radio receiver can also have Gaussian distribution. This is especially true for low signal-to-noise ratio (SNR) scenarios. Furthermore, when power control is employed in time-multiplexed OFDM (such as IEEE 802.16), the Gaussian approximation does not hold anymore, and as a consequence, classification based on normality tests may fail.

Various parameter estimation algorithms for OFDM systems exist. Methods for finding the OFDM symbol and cyclic prefix (CP) durations are mostly based on exploitation of the cyclostationarity of OFDM signaling due to cyclic prefix extension. To estimate the length of CP, time-frequency transform of the received signal is found and entropy is calculated, which is then used to find the CP size. Auto-correlation of the received signal with its delayed copy is calculated and its magnitude is normalized with average signal power. As the auto-correlation has non-zero terms only for the part that falls into the guard time, power ratio of the guard time to the symbol duration can be used to find the CP length. However, SNR knowledge is required for a precise estimation.

Subcarrier or discrete Fourier transform (DFT) size is another key parameter for OFDM systems. An algorithm based on multiple signal classification (MUSIC) technique is used to determine DFT size using eigen-decomposition to diagonalize the correlation matrix of the received signal Akaike's criteria is applied to estimate the number of subspaces or sub-carriers. However, zeros are used for generating OFDM signal instead of cyclic prefix. Once CP and symbol durations are estimated, DFT size is determined by testing DFT size values. DFT outputs are tested for Gaussianity to find the correct DFT size. If not all of the subcarriers are employed for transmission, active subcarriers should be identified. This can be performed by analyzing the power level at the output of FFT. However, this method requires knowledge of FFT size and synchronization to the received signal.

Figure 2:
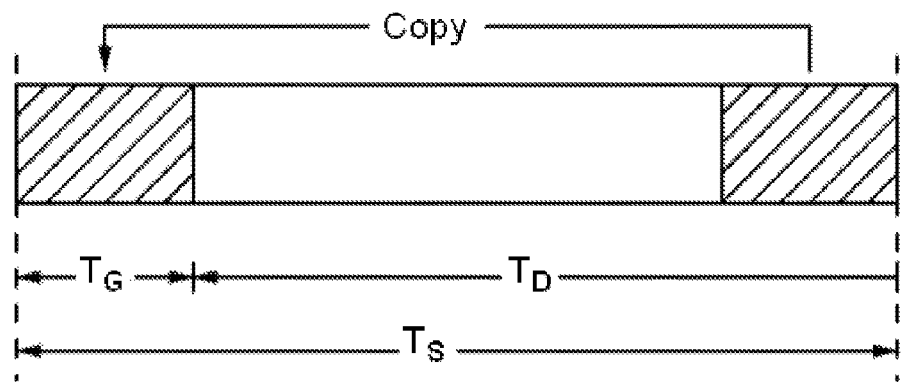
FIG. 2 is an illustration of the cylic prefix extension for OFDM systems.

OFDM converts serial data stream into parallel blocks of size NFFT and modulates these blocks using inverse discrete Fourier transform (IDFT). Thus, the OFDM signaling system was modeled. The continuous-time OFDM signal in the baseband can be written as:

$$x_m(t) = \sum_{k=1}^{K} S_m(k) e^{j\frac{2\pi\Gamma(k)t}{T_D}} \quad -T_G \le t < T_D, \quad (1)$$

where $S_m(k)$ is the transmitted data symbol at kth (data) subcarrier of mth OFDM symbol and $\Gamma$ denotes the set of K used subcarriers. Useful data duration and CP length are represented by $T_D$ and $T_G$ respectively and they make up the total duration of OFDM symbol $T_S$, i.e. $T_S = T_D + T_G$, as shown in FIG. 2. Transmitted signal can now be written as:

$$x(t) = \sum_{m=-\infty}^{\infty} x_m(t - mT_S). \quad (2)$$

After D/A conversion and radio frequencies (RF) modulation, signal is passed through the mobile radio channel which can be modeled as a time-variant linear filter $$h(t) = \sum_{i=1}^{L} h_i(t) \delta(t - \tau_i), \quad (3)$$

where L is the number of sample-spaced channel taps and $\tau_i$ is the delay of each tap. The channel is assumed to be constant over an OFDM symbol, but time-varying across OFDM symbols, which is a reasonable assumption for low and medium mobility, is possible.

At the receiver, the signal is received along with noise. After down-conversion, simplified baseband model of the received signal can be formulated as:

$$y(t) = e^{j2\pi\zeta t}[x(t) \star h(t)] + \omega(t) \quad (4)$$

$$= e^{j2\pi\zeta t} \int x(\tau)h(t-\tau)d\tau + \omega(t) \quad (5)$$

$$= e^{j2\pi\zeta t} \sum_{i=1}^{L} x(t-\tau_i)h_i(t) + \omega(t), \quad (6)$$

Where ★ denotes convolution operation and ω(t) is the additive white Gaussian noise (AWGN) sample with zero mean and variance of $\sigma^2_\omega$. ξ corresponds to the frequency offset due to inaccurate frequency synchronization with the received signal. The average received signal power is denoted by $\sigma^2_s$.

It is assumed that the receiver does not know the correct sampling rate and samples the received signal with a sampling time of Δt. Now, the discrete-time received signal can be obtained from continuous time signal as:

$$y[n] := y(n\Delta t). \quad (7)$$

In discrete-time representation, $N_D$, $N_G$ and $N_S$ are used to represent the number of samples corresponding to data, CP and total symbol durations respectively. The time durations can be calculated by multiplying these numbers with the sampling period, e.g. $T_S = N_S \Delta t$. The received signal is assumed to have D samples which contains an unknown single-carrier signal or unknown number of OFDM symbols. In vector notation the received signal can be represented as:

$$y = [y[1], y[2], \ldots y[D]]. \quad (8)$$

Mobile WiMax

The recently approved 802.16e standard (known as mobile WiMAX) uses scalable OFDMA as physical layer transmission technique. By changing the FFT size as a function of the transmission bandwidth, the subcarrier spacing is kept constant for all bandwidths aiming to reduce the inter-carrier interference (Id), due to mobility and frequency offsets, to a negligible level. The available FFT sizes and system bandwidths are given in the Table. Moreover, the fixed standard supports FFT sizes of 256 and 2048 with different bandwidths (multiple of 250 kHz and no less than 1.25 MHz). Hence the MSs should have support for various channel bandwidths. This requires dynamic detection of the FFT size and the channel bandwidth which is a similar problem to detection the primary users in a given frequency band and the algorithm proposed in the previous section might be used for this purpose. In both cases, some a priori information about the center frequencies and bandwidths of the expected signals is assumed to be available.

TABLE

Available bandwidth and FTT sizes for 802.16e.

| System bandwidth (MHz) | 1.25 | NA | 5 | 10 | 20 |
|---|---|---|---|---|---|
| Sampling frequency (MHz) | 1.429 | NA | 5.714 | 11.429 | 22.857 |
| FFT size | 128 | 256 | 512 | 1024 | 2048 |

OFDM Cyclostationary Detection

OFDM signaling is shown to be cyclostationary with period $T_S$ in (R. Heath Jr and G. Giannakis, "Exploiting input cyclostationarity for blind channel identification in OFDM systems," *IEEE Trans. Signal Processing*, vol. 47, no. 3, pp. 848-856, March 1999). It is also known that cyclostationarity of a signal holds when it is passed through a linear time-invariant channel. Hence, the received OFDM signal is also cyclostationary. Detection algorithms using the cyclostationarity characteristics of the OFDM signaling in AWGN channel were developed.

Symbol duration and CP size are estimated by assuming an OFDM transmission. For the observation vector y, OFDM symbol duration $N_D$ and CP size $N_G$ are not known as well as the start time of each symbol, denoted by θ. Let us denote the set of samples that belong to CP with Ω. The samples in CP and in the last part of OFDM symbol are pairwise correlated, as seen in FIG. 2. Using the structure of OFDM signaling, the correlation of the samples in observation vector can be written as:

$$E[y[n]y^*[n+\Delta]] = \begin{cases} \sigma_s^2 + \sigma_\omega^2 & \Delta = 0, \\ \sigma_s^2 e^{-j2\pi\xi\Delta t N_D} & \Delta = N_D; \quad n \in \Omega \\ 0 & \text{otherwise.} \end{cases} \quad (9)$$

where E [·] denotes expectation operation.

Maximum likelihood estimates of the unknown parameters $N_D$, $N_G$, and θ can be obtained by maximizing the log-likelihood function of the observations y. Log-likelihood function be formulated as:

$$\Lambda(y; N_D, N_G, \theta) = \log\left(\prod_{n\in\Omega} p(y[n], y[n+N_D]) \prod_{n\notin\Omega\cup\Omega'} p(y[n])\right) \quad (10)$$

$$= \log\left(\prod_{n\in\Omega} \frac{p(y[n], y[n+N_D])}{p(y[n])p(y[n+N_D])} \prod_n p(y[n])\right) \quad (11)$$

where p (·) is the probability distribution function (PDF) of the observed samples and p (·, ·) is the joint PDF. The set Ω' contains the samples of OFDM data that are copied to CP. Assuming that y has a jointly Gaussian distribution, it is shown that the log-likelihood function can be obtained as:

$$\Lambda(y; N_D, N_G, \theta) = \quad (12)$$

$$\left|\sum_{n\in\Omega} y(n)y^*(n+N_D)\right| - \sum_{n\in\Omega}\left(\frac{a}{2}(|y[n]|^2 + |y[n+N_D]|^2) + \frac{1}{2a}(\sigma_s^2 + \sigma_\omega^2)(1-a^2)\log(1-a^2)\right).$$

where a and Ω are as given in $$a = \frac{\sigma_s^2}{\sigma_s^2 + \sigma_\omega^2}. \quad (13)$$

$$\Omega := \{n | m(N_D + N_G) + p + \theta,$$

$$m = \left\{0, 1, \ldots, \left\lfloor\frac{D}{N_D + N_G}\right\rfloor - 1\right\}, \quad (14)$$

$$p = \{1, 2, \ldots, N_G\}, \theta = \{0, 1, \ldots, N_D - 1\}\}.$$

respectively. Please note that, ML estimation obtained by maximizing the likelihood function given by (12) is asymptotically optimal when the following assumptions are satisfied: 1) Noise is white, Gaussian, and uncorrelated with the transmission signal, 2) y has a joint Gaussian distribution with correlation function given by (9). Also note that, the ML estimation algorithm can be modified to estimate the frequency offset $\xi$ as well. The likelihood function of the received signal is evaluated at ML estimates of signal parameters, providing an estimation of signal parameters via rotational invariance techniques (ESPRIT).

The value of a, $\sigma_s^2$ and $\sigma_n^2$ are difficult to estimate in a non-cooperative scenario. At low SNR values, the second and third terms of (12) approaches to zero and can be dropped. Therefore, a suboptimal ML estimation is possible with less complexity and no need for the knowledge of noise and signal variances. Modified likelihood function can now be obtained from (12) as:

$$\tilde{\Lambda}(y; N_D, N_G, \theta) = \tag{15}$$

$$\left| \sum_{m=0}^{\lfloor \frac{D}{N_D+N_G} \rfloor} \sum_{p=1}^{N_G} y[m(N_D + N_G) + p + \theta] y^*[m(N_D + N_S) + N_D + p + \theta] \right|.$$

where $|\cdot|$ denoted the largest integer less than or equal to input argument. Note that the likelihood function is independent of the frequency offset. Hence, the proposed sub-obtimum ML estimation algorithm is $$\hat{N}_D, \hat{N}_G, \theta = \underset{N_D, N_G, \theta}{\operatorname{argmax}} \{\tilde{\Lambda}(y; N_D, N_G, \theta)\} \tag{16}$$

$$= \underset{N_D, N_G, \theta}{\operatorname{argmax}} \left\{ \left| \sum_{m=0}^{\lfloor \frac{D}{N_D+N_G} \rfloor} \sum_{p=1}^{N_G} y[m(N_D + N_G) + p + \theta] \right. \right. \tag{17}$$

$$\left. \left. y^*[m(N_D + N_S) + N_D + p + \theta] \right| \right\}.$$

Maximization given in (17) is a computationally demanding process. In order to reduce the complexity, maximization can be performed in two steps. First, OFDM symbol length $N_D$ is estimated, and second the estimated $N_D$ value is used to find CP duration $N_G$ and timing offset $\theta$. The simplification on the computational complexity comes with the expense of performance degradation.

The repetition due to CP is used to find the OFDM data duration $T_D$. As the receiver is assumed to have no prior information on the symbol duration, all expected values should be tested. The discrete correlation of the received signal can be written as:

$$R_y(\Delta) = \frac{1}{D-\Delta} \sum_{n=1}^{D-\Delta} y[n] y^*[n+\Delta]. \tag{18}$$

Assuming enough statistical averaging, the correlation can be obtained as:

$$R_y(\Delta) = \begin{cases} \sigma_s^2 + \sigma_\omega^2 & \Delta = 0, \\ \frac{N_G}{N_D + N_G} \sigma_s^2 e^{-j2\pi\xi\Delta t N_D} & \Delta = N_D, \\ 0 & \text{otherwise,} \end{cases} \tag{19}$$

Hence, the auto-correlation based estimation of $N_D$ can be formulated as:

$$\hat{N}_D = \underset{\Delta}{\operatorname{argmax}} \{|R_y(\Delta)|\}, \Delta > 0. \tag{20}$$

Once the OFDM symbol duration $N_D$ is found, the CP duration can be estimated by testing for different $N_G$ values as:

$$\hat{N}_G, \hat{\theta} = \underset{N_G, \theta}{\operatorname{argmax}} \{\tilde{\Lambda}(y; \hat{N}_D, N_G, \theta)\}. \tag{21}$$

Usually, the CP length is chosen as a multiple of OFDM symbol duration. In IEEE 802.16 systems, for example, available sizes are ¼, ⅛, 1/16 and 1/32 (*IEEE Standard for Local and Metropolitan area networks Part 16: Air Interface for Fixed and Mobile Broadband Wireles Access Systems Amendment 2: Physical and Medium Access Control Layers for Combined Fixed and Mobile Operation in Licensed Bands and Corrigendum 1*, The Institute of Electrical and Electronics Engineering, Inc. Std. IEEE 802.16E-2005, 2005). Therefore, in order to further reduce the complexity, the CP size hypotheses can be limited to these ratios of the estimated $N_D$ value from previous step.

Figure 3:
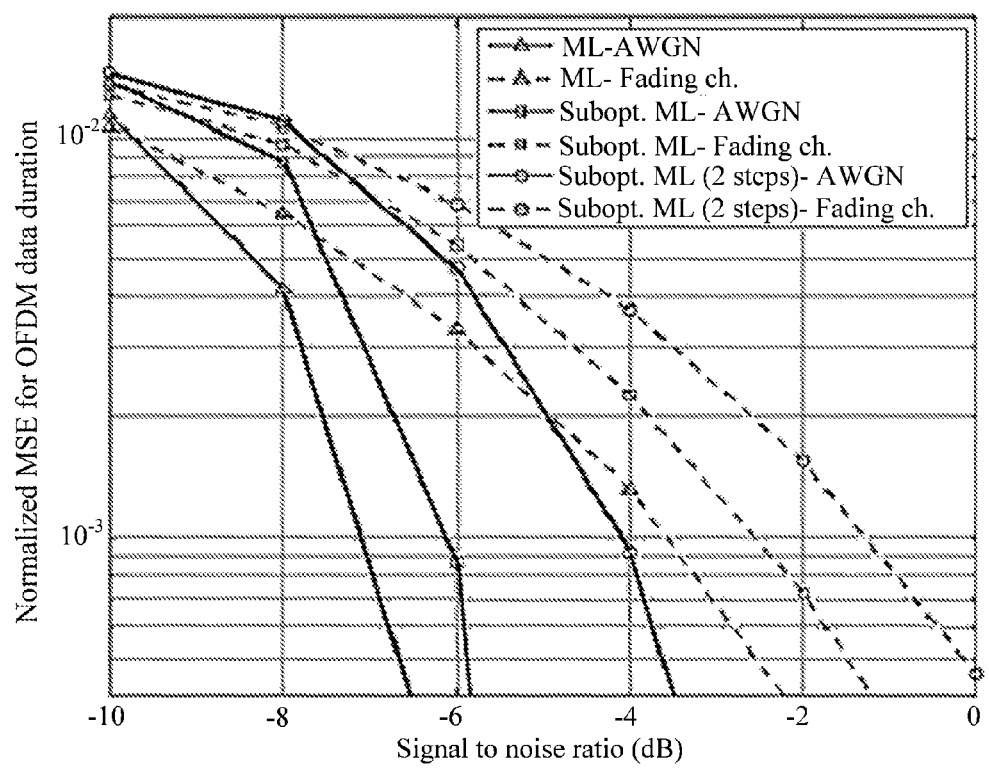
FIG. 3 is a graph comparing the numerical performance of ML, suboptimal ML, and two-step algorithms. Normalized MSE of OFDM symbol duration estimation versus SNR is also shown.

A numerical comparison of ML, suboptimal ML, and two-step low-complexity algorithms is given in FIG. 3 which shows the normalized mean-squared-error (MSE) of OFDM data duration estimation for AWGN and multi-path fading channels for a WLAN system. As can be seen from this figure, the performance loss for the suboptimal method is around 1-1.5 dB as compared to the ML method. Please note that for ML algorithm, perfect noise and signal variance knowledge is assumed; and the performance of ML algorithm is expected to decrease when these parameters are not perfectly known. Another 2 dB performance loss is observed when low-complexity two step method is used instead of calculating (17).

The modified likelihood function (15), using the two-step estimation algorithm, evaluated at the estimated values can be written as:

$$\gamma = \tilde{V}(y; N_D, N_G, \theta)|_{\hat{N}_D, \hat{N}_G, \theta} = \tilde{V}(y; \hat{N}_D, \hat{N}_G, \theta). \tag{22}$$

Eqn. (22) gives us the likelihood of receiving y for an OFDM system which has the estimated parameters. For OFDM signals, $\gamma$ converges to $$\left\lfloor \frac{D}{\hat{N}_D + \hat{N}_G} \right\rfloor \hat{N}_G \sigma_s^2$$

and for non-OFDM signals, it becomes zero, i.e.

$$\gamma = \begin{cases} \left\lfloor \dfrac{D}{\hat{N}_D + \hat{N}_G} \right\rfloor \hat{N}_G \sigma_s^2 & H_1 \\ 0 & H_0, \end{cases} \qquad (23)$$

where $\mathcal{H}_0$ and $\mathcal{H}_1$ represent the null hypothesis and alternate hypothesis, i.e. the received signal is not OFDM signal or it is an OFDM signal, respectively. This observation is used for classification of a signal as single-carrier or multi-carrier (OFDM) by comparing $\gamma$ to a threshold $\xi$. The received signal is classified as OFDM signal if $\gamma > \xi$.

The value of decision threshold depends on the incoming (OFDM) signal power and desired probability of false alarm (or probability of miss). Signal power can be found using the total signal if SNR is known. In non-cooperative environments, SNR knowledge is usually unavailable. In such a case, a low SNR value can be assumed.

The proposed algorithms were tested using computer simulations. As for OFDM system, IEEE 802.11a based WLAN was utilized. For this system, the transmission bandwidth is 20 MHz and number of subcarriers is 64, out of which 11 subcarriers are used as guard subcarriers and one as DC subcarrier. Furthermore, 8 subcarriers are deactivated in order to model a cognitive radio system. CP contains 16 samples, hence, CP rate is ¼. For this system, CP and total symbol durations correspond to 0.8 μs and 4 μs respectively. The sampling rate of received signal is assumed to be unknown to the cognitive radio and signal is assumed to be sampled at a rate 50% higher than Nyquist rate. An exponentially decaying power delay profile (PDP) with 90 ns root-mean-squared (RMS) delay spread is used for modeling wireless channel. Simulation results are obtained for 25, 50 and 100 consecutive OFDM symbols. The threshold for classifying signal as OFDM is chosen as $$\zeta = \dfrac{\sigma_s^2 + \sigma_\omega^2}{2} \left\lfloor \dfrac{D}{\hat{N}_G + \hat{N}_D} \right\rfloor \hat{N}_G.$$

This value corresponds to a 0 dB SNR value. Normalized MSE is used as a performance measure of the estimation as it reflects both the bias and the variance of the estimation.

Figure 4:
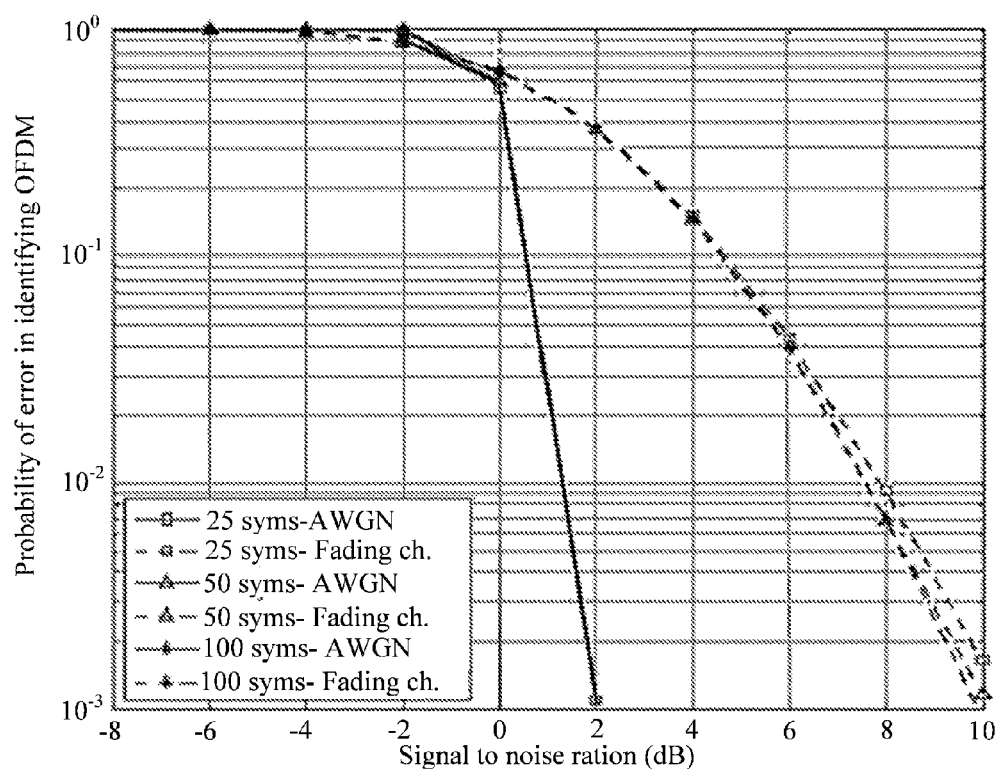
FIG. 4 is a graph indicating the probability of incorrect detection for OFDM signal for different numbers of symbols under AWGN and fading channels.
Figure 5:
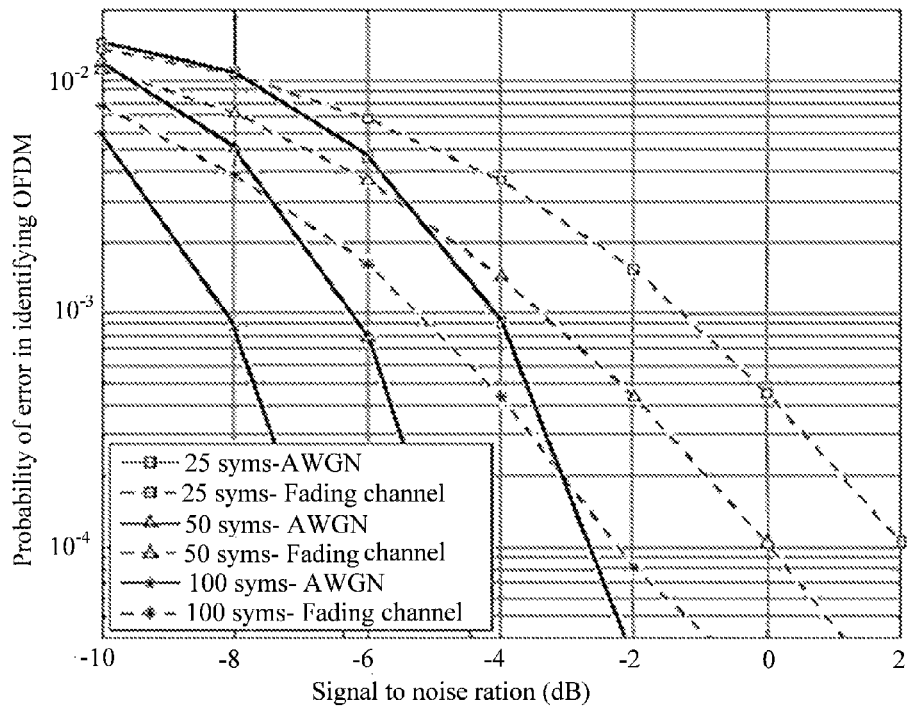
FIG. 5 is a graph showing normalized MSE of OFDM symbol duration as a function of SNR for differing numbers of symbols under AWGN and fading channels.

FIG. 4 shows the probability of incorrect classification of the simulated OFDM signal as single-carrier in AWGN and multi-path fading channels. As this figure shows, the classification is successful even at low SNR values and no error is observed for 10 dB or higher SNR values. Note that for AWGN channel, 0 dB is a decision boundary for classification. This boundary is the selected threshold $\xi$ which corresponds to 0 dB SNR assumption for the received signal. If SNR information is available, the decision threshold 4 can be changed adaptively decreasing the false alarm and mis-detection rates. The normalized MSEs for $T_D$ is given in FIG. 5. Similar results were obtained for MSE of CP time $T_G$. The estimation is more accurate for AWGN channel than multi-path fading channel as expected. It is noted that the number of available OFDM symbols used for estimation affects the performance of the estimation because of noise averaging.

Partial Match Filtering

Figure 6:
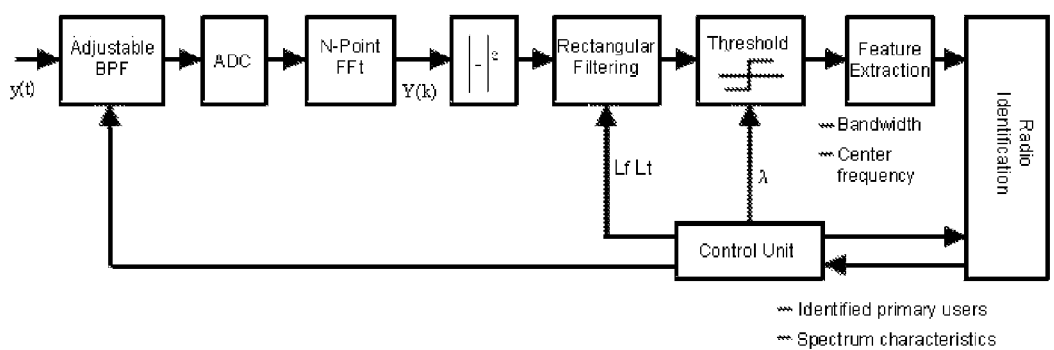
FIG. 6 is a block diagram of the energy detector-based partial match-filtering method of the present invention.

Partial match-filtering (PMF) matches the primary users' signals parameters instead of the signals. The block diagram of the proposed algorithm is shown in FIG. 6. The signal that arrives to cognitive user y(t) is first filtered with a band pass filter (BPF) to extract the signal in the frequencies of interest. This filter may be adjustable and controlled by a control unit in order to scan a wider range. The output of the filter is sampled at Nyquist rate and N-point FFT is applied to obtain the frequency domain samples which can be modeled as $$Y_m(k) = \begin{cases} W_m(k) & H_0, \\ S_m(k) + W_m(k) & H_1, \end{cases} \quad k = 1, \ldots, N \qquad (24)$$

where $S_m(k)$ is the transmitted signal by primary users at the output of mth FFT operation, $W_m(k)$ is the white noise sample at kth frequency sample, and N is the FFT size. $\mathcal{H}_0$ and $\mathcal{H}_1$ represent the null hypothesis and alternate hypothesis respectively. The white noise is modeled as a zero-mean Gaussian random variable with variance $\sigma_0^2$, i.e. $W(k) = N(0, \sigma_0^2)$. The signal term is also modeled as a zero-mean Gaussian variable whose variance is a function of frequency, i.e. $S(k) = N(0, \sigma_k^2)$, where $\sigma_k$ is the local standard deviation. The variation of $\sigma_k$ across frequency depends on the characteristics of primary users signals and operating frequency. Hence, by changing the signal variance across frequency, PSDs for various technologies can be represented.

Frequency Domain Filtering

The magnitude square of FFT output $|Y_m(k)|^2$ can be compared with a threshold value for detection of presence of transmission at a particular frequency. Filtering is applied before applying the threshold detector to smooth the FFT output. The optimum filter coefficients depend on the statistics of primary user's signal as well as the noise power. Minimum mean-square error (MMSE) filtering is applied for estimating the noise plus interference ratio for OFDM systems, using filter coefficients derived as a function of the statistics of interference. As an approximation to MMSE filtering, a sliding rectangular window can also be applied for smoothing the spectrum estimates Y(k). Use rectangular filter, the decision statistics at different frequencies can be calculated as $$\tilde{Y}_m(k) = \sum_{l=k-\lfloor L_f/2 \rfloor}^{k+\lfloor L_f/2 \rfloor} \sum_{u=m-L_t+1}^{m} |Y_u(l)|^2 \qquad (25)$$

Where [·] represents the floor function, and $L_t$ and $L_f$ are the averaging filter lengths in time and frequency directions respectively.

B. Threshold Detector

The sensing time index m is dropped for simplicity. The output of the rectangular filter $\tilde{Y}(k)$ is fed to a threshold device to identify the frequencies occupied by the primary users. This is equivalent to distinguishing between the following two hypotheses:

$$H_0: Y(k) = W(k), \qquad (26)$$

$$H_1: Y(k) = S(k) + W(k). \qquad (27)$$

As Y(k) has Gaussian distribution, the decision statistics $\tilde{Y}(k)$ follows chi-square distribution with $2L_f L_t$ degrees freedom, $\chi^{2L_f L_t}$. Hence, $\tilde{Y}(k)$ can be modeled as:

$$\tilde{Y}(k) = \begin{cases} \frac{\sigma_0^2}{2}\chi^2_{2L_fL_t} & H_0, \\ \frac{\sigma_0^2+\sigma_k^2}{2}\chi^2_{2L_fL_t} & H_1, \end{cases} \quad k=1,\ldots,N \quad (28)$$

where $\sigma^2_0$ and $\sigma^2_k$ are as defined before. The performance of the detection algorithm can be summarized with two probabilities: probability of detection $P_D$ and probability of false alarm $P_F$. $P_D$ is the probability of detecting a signal on the considered frequency when it is truly present, thus large detection probability is desired. It can be formulated as:

$$P_D = P_r(\tilde{Y} > \lambda | H_1), \quad (29)$$

where $\lambda$ is the threshold value. $P_F$ is the probability that the test incorrectly decides that the considered frequency is occupied when it actually is not, and it can be written as:

$$P_F = P_r(\tilde{Y} > \lambda | H_0). \quad (30)$$

Figure 7:
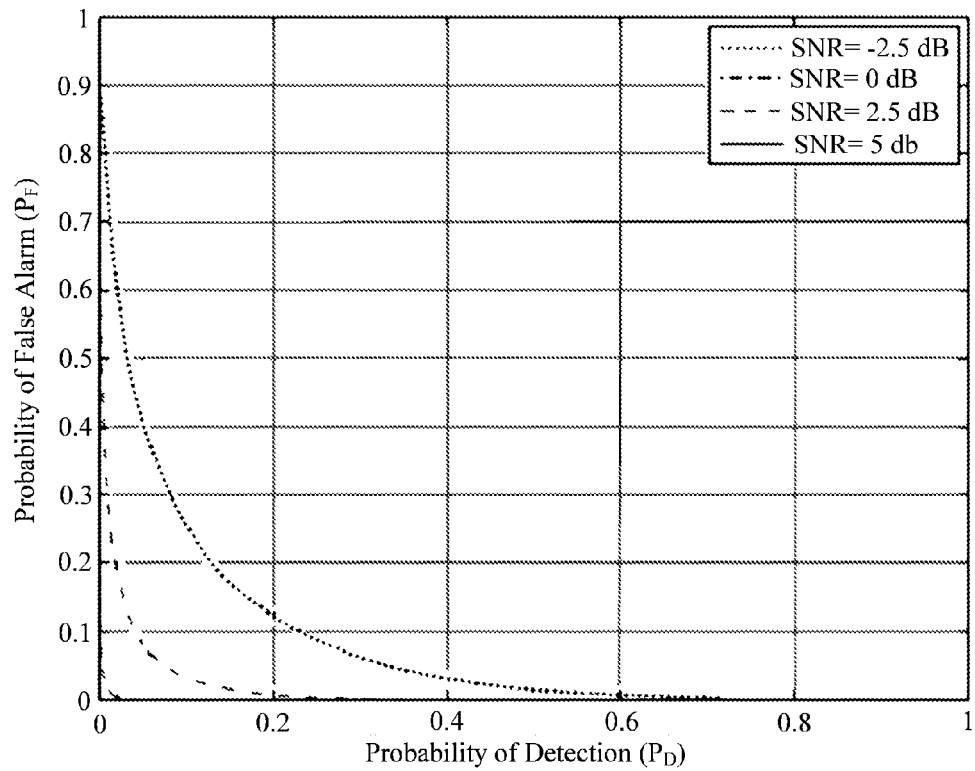
FIG. 7 is a graph of receiver operating characteristics curves for different SNR values of a single frequency sample.

$P_F$ should be kept as small as possible. The probabilities $P_F$ and PD can be calculated as:

$$P_F = 1 - \Gamma\left(L_fL_t, \frac{\lambda}{\sigma_0^2}\right), \quad (31)$$

$$P_D = 1 - \Gamma\left(L_fL_t, \frac{\lambda}{\sigma_0^2+\sigma_k^2}\right), \quad (32)$$

where $\Gamma(a, x)$ is the incomplete gamma function provided in (M. Abramowitz and I. Stegun, Eds., *Handbook of Mathematical Functions With Formulas, Graphs, and Mathematical Tables*, 9th ed. National Bureau of Standards, 1970). In general, $P_D$ and $P_F$ are inversely proportional. FIG. 7 shows the receiver operating characteristics (ROCS) for a single frequency sample at the output of threshold device for different SNR values. SNR is defined as the ratio of the primary user's signal power to noise power, i.e. SNR=$\sigma^2_k/\sigma^2_0$. The averaging size is set to 15 in this figure. As this figure clearly shows, the performance of the threshold detector increases at high SNR values. The noise power is normalized before it is fed into the threshold device.

The decision threshold $\lambda$ can be selected for finding an optimum balance between $P_D$ and $P_F$. However, this requires the knowledge of noise and detected signal powers as seen in (31) and (32). Noise power can be estimated, but the signal power is difficult to estimate as it changes depending on the ongoing transmission characteristics and the distance between the cognitive radio and primary user. It is assumed that the noise variance is estimated and the threshold is chosen to obtain a false alarm rate of 0.1 percent.

Feature Extraction

Figure 8:
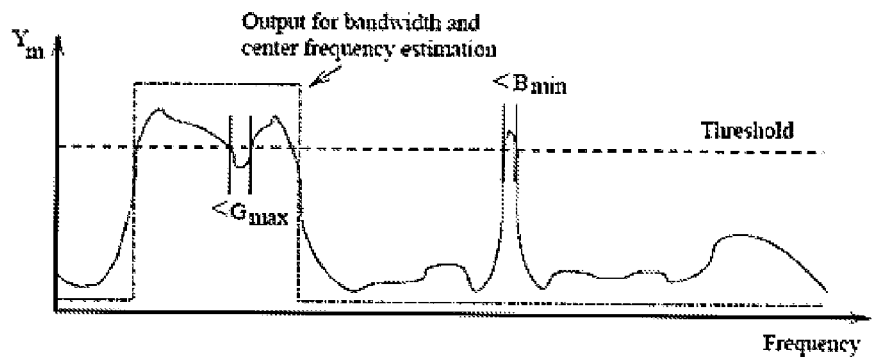
FIG. 8 is an illustration of a DUDE algorithm for bandwidth and center frequency estimation.

Two features, bandwidth and center frequencies of primary users, are extracted by using the threshold detector output. In order to achieve this, the bins exceeding the threshold value are grouped together. In order to reject the erroneous bins, a method similar to the initial stage of dynamic undersea detection extractor (DUDE) algorithm was applied by defining two parameters $B_{min}$ and $G_{max}$. $B_{min}$ is the minimum assumed bandwidth for the primary users and $G_{max}$ is the maximum gap allowed between two frequency samples. The feature extraction algorithm searches for continuous frequencies which are marked by threshold detector as having signal, not $G_{max}$ samples away and with more adjacent frequency samples than $B_{min}$ as illustrated in FIG. 8. Hence, using these two parameters, the occupied frequency band can be identified. It is then straightforward to estimate the bandwidth and the center frequency of transmission which make up the feature set x. One drawback of this method, however, is that the cognitive radio may not differentiate between two (or more) superimposed primary user transmissions and threat them as a single transmission with a larger bandwidth.

Classification

Primary users are identified by using the a priori information about their transmission parameters. Feature sets are classified using Bayesian decision rule measurements in the previous section to systems or devices that have the highest a posteriori probability. The classifier can be represented in terms of a set of discriminant functions $g_i(x)$, i=1, ..., K where K is the total number of systems. Note that the same RATs operating at different bands are regarded as different systems for the sake of classification. The transmission band of a system needs to be known for identifying the frequencies occupied by primary users. The discriminant functions are defined as:

$$g_i(x) = \log P(x|\omega_i) + \log P(\omega_i). \quad (33)$$

where $P(w_i)$ is the prior probability of class $w_i$, and $P(x|w_i)$ is the class conditional probability which is assumed to have multivariate normal distribution with mean vector $\mu_i$ and covariance matrix $\Sigma_i$. Under such an assumption, the discriminant functions can be obtained as:

$$g_i(x) = -\frac{1}{2}(x-\mu_i)^T \sum_i^{-1} (x-\mu_i) - \frac{1}{2}\log\left|\sum_i\right| + \log P(\omega_i). \quad (34)$$

The classification regions defined by (34) are quadratic functions. Therefore, $g_i(x)$ is known as normal-based quadratic discriminant function. The classification rule can now be written as: assign a feature vector x to a system $w_i$ if $g_i(x) > g_j(x)$ for all $j \neq i$.

The discriminant function $g_i(x)$ is locally estimated. When collaborative sensing is used, classification results can be shared among cognitive radios. Alternatively, cognitive radios can share the discriminant function values, allowing a central unit to combine these values and make a more optimum decision based on the discriminant function values from all cognitive radios present in the environment.

The mean vector $\mu_i$ can be obtained by using the expected values of features, e.g. bandwidth and center frequency in this case. In practice, the covariance matrix $\Sigma_i$ is unknown and can be replaced with estimates based on the training data as $$\hat{\sum}_i = \frac{1}{N-1}\sum_{j=1}^N (x_j - \mu_i)(x_j - \mu_i)^T. \quad (35)$$

Furthermore, the covariance matrix can be assumed to be the same for all classes using the same RAT. For example, all the classes using WLAN are expected to have the same covariance matrix as only center frequency is changed. When the estimated features are not correlated to each other, the correlation matrix becomes a diagonal matrix. Different features will have different units and hence proper normalization of this features needs to be established. Moreover, the values of diagonal elements give the weights for each feature, and different weights can be assigned to different features.

Figure 9:
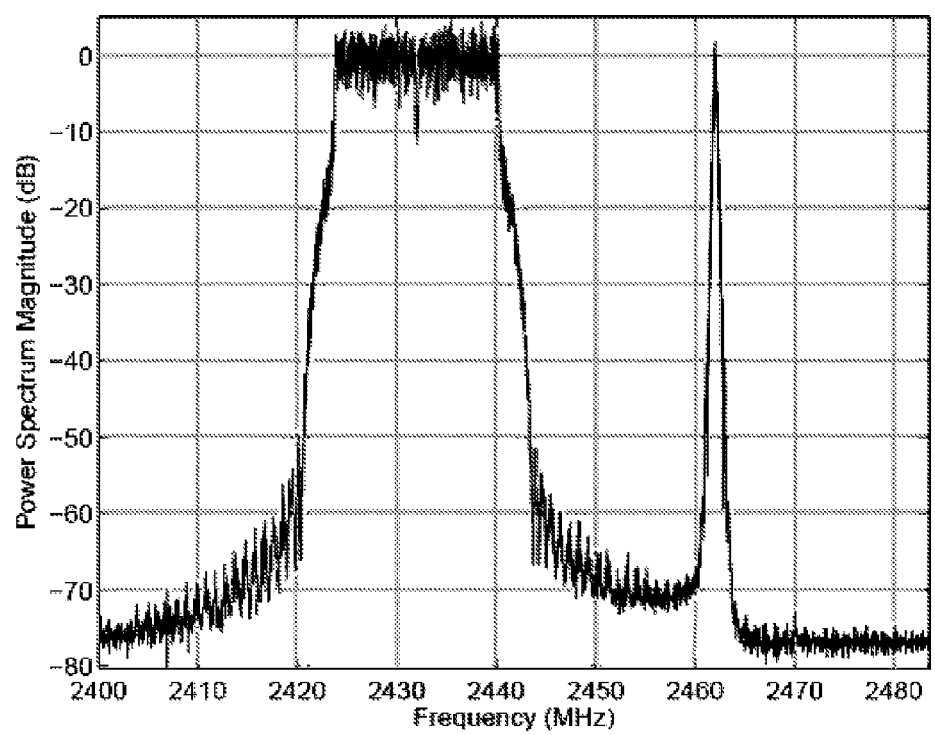
FIG. 9 is a graph showing power spectral density of tested WLAN and Bluetooth signals.

The proposed algorithm was tested using two RATs in 2.4 GHz industrial, scientific and medical (ISM) bands, WLAN and Bluetooth signals. The ISM band is an unlicensed band, without primary users. It is assumed that Bluetooth signal is not changing hopping frequency during the detection phase, i.e., the detection process takes much less than 675 μs. Both WLAN and Bluetooth signals are assumed to have the same power and prior probabilities, and no overlap of spectrum between the two signal is allowed. The latter assumption can be justified by the adaptive frequency hopping (AFH) capability of Bluetooth. The spectrum of the ISM band is calculated using 1024-point FFT. Hence the frequency separation between two FFT output samples is 81.5 kHz, i.e. at least 12 frequency points will have Bluetooth signal and at least 246 frequency points will have WLAN signal. The length of the frequency domain filter is set to 5, i.e. $L_f=5$. FIG. 9 shows the PSD of a WLAN signal operating at channel 5 ($F_c=2.432$ GHz) and a Bluetooth signal at frequency $F_c=2.462$ GHz. WLAN and Bluetooth signals are generated by transmitting random data modulated using OFDM and Gaussian frequency shift keying (GFSK) modulations as defined in their corresponding standards.

The features, transmission bandwidth and center frequency, are calculated after passing the FFT output through a threshold device and finding continuous frequencies with power larger than the threshold. The threshold is chosen to have a low false alarm rate of 0.1 percent, i.e. $P_F=0.001$. Note that while setting the threshold, the noise variance is assumed to be known. The feature extraction parameters are set as $G_{max}=30$ and $B_{min}=6$ which correspond to 2.44 MHz and 490 kHz respectively.

Figure 10:
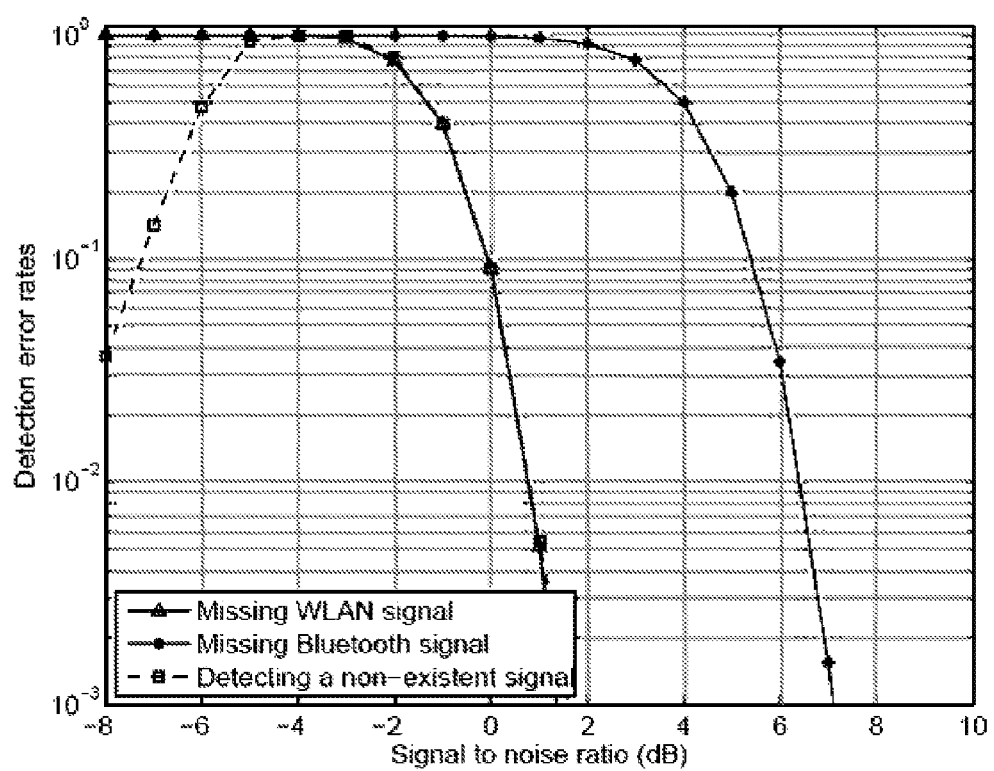
FIG. 10 is a graph indicating detection error rates for WLAN and Bluetooth systems at different SNR values for $L_t=15$.
Figure 11:
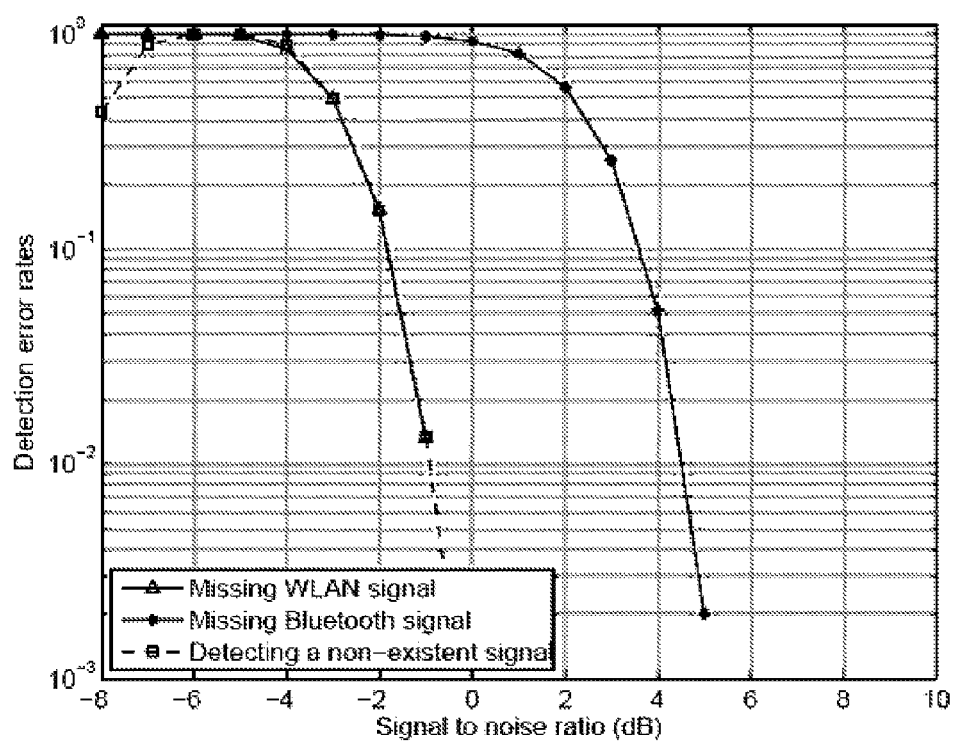
FIG. 11 is a graph indicating detection error rates for WLAN and Bluetooth systems at different SNR values for $L_t=30$.

FIGS. 10 and 11 show the error rates in detecting the WLAN and Bluetooth signals for additive white Gaussian noise (AWGN) channels. The error rate for identifying a non-existent system (or a system in another band) is shown as well. The time averaging $L_t$ for FIG. 10 and FIG. 11 are set to be 15 and 30 respectively. Hence, sensing durations correspond to 184 μs and 368 μs. The classification is quite successful even at very low SNR scenarios and performance increases with increasing averaging duration. Note that the error rates for WLAN is smaller for a given SNR value because of the large bandwidth and large separation of center frequencies of WLAN signals.

Figure 12:
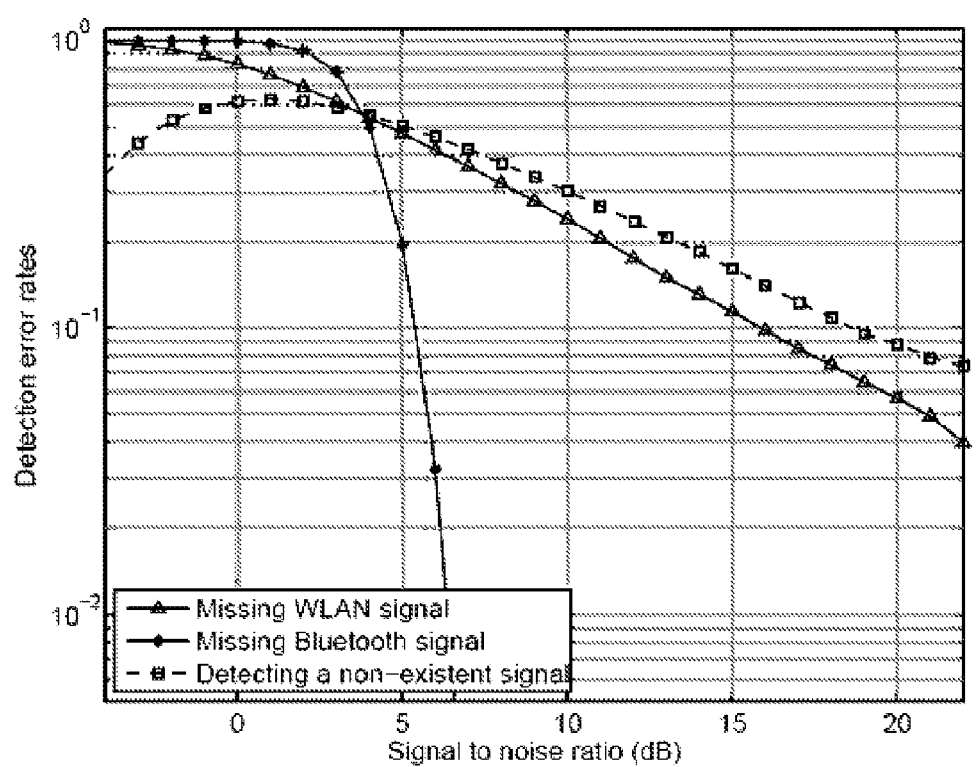
FIG. 12 is a graph indicating detection error rates for WLAN and Bluetooth systems at different SNR values for $L_t=15$ under a multi-path fading channel.

FIG. 12 shows the performance of energy detector based algorithm when the received signal is passed through a multipath channel with exponential delay power delay profile (PDP) with root-mean-squared (RMS) delay spread value of 50 ns. The performance of the Bluetooth signal detection is affected very little while the performance of WLAN detection is decreased. The power fluctuations within the large bandwidth of the WLAN signal due to frequency selectivity and fading causes the performance degradation.

When the received signal is weak (low SNR values), the signal power falls below the noise floor. In such cases, the comparator yields zero output mostly due to the low $P_F$ settings. Hence, no transmissions can be detected. As a result of this, the probability of missing ongoing transmissions becomes one and probability of detecting a non-existent signal approaches to zero.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of sensing waveform spectrum, comprising the steps of:
  obtaining a radio, further comprising
    a cognitive radio engine adapted to examine a radiowave frequency band;
    an input in electrical communication with the cognitive radio engine;
  extracting signal features from a test frequency, further comprising:
    collecting at least one signal from the test frequency, wherein the signal comprises radio access technology information and at least one transmission parameter of the signal;
    inputting the at least one signal to the cognitive radio engine;
    determining radio access technology from the radio access technology information using a classifier selected from the group consisting of pattern recognition, neural networks, and statistical classification;
    extracting the at least one transmission parameter of the signal using at least one algorithm selected from the group consisting of energy detector or cyclostationary feature extraction fast Fourier transform time frequency transform, discrete Fourier transform, and inverse discrete Fourier transform;
    wherein a square of the fast Fourier transform output is compared to a threshold value to determine primary use in the test frequency;
  using the extracted signal features to identify primary use of a transmission spectrum; and
  exploiting the primary use for multi-dimensional spectrum characterization.

2. The method of claim 1, wherein symbol duration and cyclic prefix size are extracted using known OFDM transmission characteristics.

3. The method of claim 1, wherein symbol length is used to calculate cyclic prefix duration and timing offset.

4. The method of claim 1, wherein repetition in cyclic prefix is used to find data duration.

5. The method of claim 4, wherein the cyclic prefix duration is a multiple of symbol duration selected from the group consisting of ¼, ⅛, 1/16, and 1/32.

6. The method of claim 1, wherein a band pass filter is used to extract the signal features from the test frequency.

7. The method of claim 6, wherein the filtered signals are sampled at Nyquist rate.

8. The method of claim 1, wherein feature sets are classified using Baysean decisions.

9. The method of claim 1, wherein the discrete Fourier transform uses algorithms selected from the group consisting of multiple signal classification, akaike's criteria, and eigene decomposition.

10. The method of claim 1, wherein the transmission parameters are selected from the group consisting of bandwidth, center frequency, single carrier, multi-carrier, maximum signal duration, multiple accessing, duplexing method, frame duration, spreading codes, cumulants, power moment matrices, and zero-crossing rate.

11. The method of claim 1, wherein the at least one algorithm is energy detector and cyclostationary feature extraction.

12. The method of claim 1, further comprising identifying active subcarriers, wherein the active subcarriers are identified by analyzing the power level at the output of FFT.

* * * * *